United States Patent
Okamoto et al.

(10) Patent No.: US 6,879,193 B2
(45) Date of Patent: Apr. 12, 2005

(54) SEMICONDUCTOR INTEGRATED CIRCUIT AND ITS RESET METHOD

(75) Inventors: Minoru Okamoto, Suita (JP); Shinichi Marui, Katano (JP); Kazuhiro Okabayashi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/484,904

(22) PCT Filed: Nov. 20, 2002

(86) PCT No.: PCT/JP02/12141

§ 371 (c)(1),
(2), (4) Date: Jan. 27, 2004

(87) PCT Pub. No.: WO03/073616

PCT Pub. Date: Sep. 4, 2003

(65) Prior Publication Data

US 2004/0169974 A1 Sep. 2, 2004

(30) Foreign Application Priority Data

Feb. 28, 2002 (JP) ........................................ 2002-053325

(51) Int. Cl.$^7$ ................................................. H03L 7/00
(52) U.S. Cl. ..................................................... 327/143
(58) Field of Search ............................... 327/142, 143, 327/198, 564, 565

(56) References Cited

U.S. PATENT DOCUMENTS 6,335,646 B1 * 1/2002 Nagatomo ................. 327/143
6,469,552 B2 * 10/2002 Ohbayashi et al. ......... 327/143
6,556,057 B2 * 4/2003 McClure ..................... 327/143

FOREIGN PATENT DOCUMENTS

| JP | 1-269114 A | 10/1989 |
|---|---|---|
| JP | 6-303117 A | 10/1994 |
| JP | 11-027121 | 1/1999 |

* cited by examiner

*Primary Examiner*—Jeffrey Zweizig
(74) *Attorney, Agent, or Firm*—McDermott Will & Emery LLP

(57) ABSTRACT

In a circuit block 110 to be an object of power-off, voltage detecting circuits 130 and 134 are disposed near power supply terminals 140 and 142, respectively, and voltage detecting circuits 132 and 136 are disposed at given positions far from the terminals 140 and 142, respectively, on power lines 141 and 143 of two electric-supply systems. The voltage detecting circuits are each made of MOS transistors only. At turning on the power from a power supply circuit 150 again, after all the voltage detecting circuits have detected arrival of power-supply voltages at a predetermined potential, a reset signal generating circuit 160 stops the input of a reset signal to the circuit block 110. Accordingly, since the reset state is stopped after the arrival of the power-supply voltages at the predetermined voltage, a semiconductor integrated circuit is initialized normally. This provides a semiconductor integrated circuit capable of generating a power-on reset signal appropriately.

10 Claims, 9 Drawing Sheets

RESET SIGNAL GENERATING CIRCUIT

SEMICONDUCTOR INTEGRATED CIRCUIT AND ITS RESET METHOD

TECHNICAL FIELD

The present invention relates to reduction of power consumption in an LSI constituted by a plurality of circuit blocks and in a system constituted by a plurality of LSIs.

BACKGROUND ART

With recent progress of technology relating to LSIs, a plurality of LSIs implementing sophisticated digital signal processing have been incorporated into mobile equipment. Since the mobile equipment typified by cellular phones is driven by batteries, reduction of power consumption in the incorporating equipment by shutting off power supply to an LSI which is not in operation has been widely performed for the purpose of extending the operating time thereof. To bring the LSI to an operating state again after the shut-off of the LSI, it is necessary to initialize (reset) the LSI appropriately. In particular, the reset at turning on of power is called power-on reset.

To appropriately generate a signal for this power-on reset, the use of a configuration in which a CR time constant circuit and an inverter are combined is known to date. Hereinafter, a conventional technique will be described with reference to FIG. 12. A circuit shown in FIG. 12 is configured to generate a power-on reset signal 1220 from an inverter 1210 constituted by a p-MOS transistor 1215 and an n-MOS transistor 1217 when a potential 1203 at a CR time constant circuit constituted by a resistor 1201 and a capacitance 1202 exceeds the threshold voltage of the inverter 1210.

In addition to the configuration shown in FIG. 12, a configuration including a voltage divider circuit constituted by a resistance, a comparator, a time-constant circuit constituted by, for example, a rated current generator and a capacitance, and an inverter is proposed as a power-on reset circuit in Japanese Laid-Open Publication No. 10-207580, for example.

(Problems to be Solved)

However, any of the conventional circuit configurations is formed by a resistor and a capacitor, so that the configurations are highly susceptible to characteristic errors in the process of fabricating a semiconductor circuit. Accordingly, the conventional circuit configuration shown in FIG. 12 has a problem that a period during which a reset signal is active changes from one product to another, and thus the reset is stopped before the power-supply potential at an LSI or a circuit block to be reset (hereinafter, collectively referred to as "a circuit block") rises to an appropriate value.

The configuration proposed in the above publication is complicated, so that there arises a problem that the configuration cannot be incorporated into an LSI easily.

DISCLOSURE OF INVENTION

It is therefore an object of the present invention to provide a semiconductor integrated circuit which does not generate a power-on reset signal until the power supply voltage in a circuit block to be reset rises to a predetermined potential and which is capable of appropriately initializing the circuit block to which power is turned on again.

To achieve this object, according to the present invention, attention is given to the fact that the potential on a power line varies depending on positions on the power line, and thus potentials on the power line are detected at a plurality of positions and all the results of these potential detections are considered, thereby generating a power-on reset signal.

Specifically, an inventive semiconductor integrated circuit is characterized by including: a circuit block including a power line of at least one electric-supply system and a plurality of internal semiconductor devices to which power is supplied from the power line; a plurality of voltage detecting means each connected to the power line at a given position on the power line and each outputting a voltage detection signal at a given potential when the potential at the given position on the power line is a predetermined potential; first power supply means for supplying or shutting off power to the circuit block in accordance with a power-supply control signal input from outside; reset signal generating means for receiving the voltage detection signals from the plurality of voltage detecting means and outputting a reset signal to the circuit block when all the voltage detection signals from the plurality of voltage detecting means are not at the given potential, while stopping the output of the reset signal to the circuit block after all the voltage detection signals are at the given potential; and second power supply means for supplying power to the reset signal generating means.

The inventive semiconductor integrated circuit is characterized in that each of the plurality of voltage detecting means includes voltage detecting means connected to the power line at a given position on the power line farthest from a starting point of power supply.

The inventive semiconductor integrated circuit is characterized in that each of the plurality of voltage detecting means includes a p-MOS transistor and an n-MOS transistor; the power line is connected to the drain of the p-MOS transistor; the gate of the p-MOS transistor and the source and gate of the n-MOS transistor are grounded; and the source of the p-MOS transistor is connected to the drain of the n-MOS transistor at a connection point, and the potential at the connection point is output as the voltage detection signal.

The inventive semiconductor integrated circuit is characterized in that the reset signal generating means includes: a logic gate for receiving the voltage detection signals from the plurality of voltage detecting means and detecting that all the voltage detection signals are at the given potential; and a delay unit for delaying the output of the logic gate by a given time, wherein the output of the delay unit is output to the circuit block as the reset signal.

The inventive semiconductor integrated circuit is characterized in that the reset signal generating means includes: a logic gate for receiving the voltage detection signals from the plurality of voltage detecting means and detecting that all the voltage detection signals are at the given potential; and flip-flop circuits with a plurality of stages for sequentially delaying the output of the logic gate with a clock signal input from outside; the output of the flip-flop circuit at the final stage is output to the circuit block as the reset signal.

The inventive semiconductor integrated circuit is characterized in that the first power supply means and the second power supply means are integrated on a semiconductor substrate.

The inventive semiconductor integrated circuit is characterized in that the circuit block and the reset signal generating means are integrated on a semiconductor substrate.

The inventive semiconductor integrated circuit is characterized in that the circuit block, the reset signal generating means, the first power supply means and the second power supply means are integrated on a semiconductor substrate.

A semiconductor-integrated-circuit-resetting method for resetting, to an initial state, a circuit block provided in a semiconductor integrated circuit including: a power line of at least one electric-supply system; and the circuit block including a plurality of internal semiconductor devices to which power is supplied from the power line is characterized in that: power-supply potentials are detected at a plurality of positions on the power line; whether or not all the power-supply potentials at the plurality of positions on the power line reach a predetermined potential is detected; and a reset signal to be output to the circuit block is stopped when the result of the detection is true.

The inventive semiconductor-integrated-circuit-resetting method is characterized in that: an inverter including a p-MOS transistor and an n-MOS transistor is provided; and the potentials on the power line are detected using a potential detecting circuit in which the drain of the p-MOS transistor is connected to the power line.

As described above, according to the present invention, in the inside of the circuit block, though the power-supply potential decreases as the distance from the starting point of power supply on the power line increases, power-supply potentials are detected at a plurality of positions on the power line, so that the reset of the semiconductor integrated circuit is stopped on or after the point in time when the detected power-supply potentials reach a predetermined potential. Accordingly, the semiconductor integrated circuit is initialized normally, and then the semiconductor integrated circuit starts its operation.

In particular, according to the present invention, potential detecting means using neither a resistor nor a capacitor but using only MOS transistors generates a power-on reset signal, so that the semiconductor integrated circuit is less susceptible to characteristic errors in the process of fabrication, thus ensuring generation of the power-on reset signal at a desired timing.

BEST MODE FOR CARRYING OUT THE INVENTION

Hereinafter, embodiments of the present invention will be described with reference to the drawings.

EMBODIMENT 1

FIGS. 1 through 5 show a semiconductor integrated circuit according to a first embodiment of the present invention.

Figure 1:
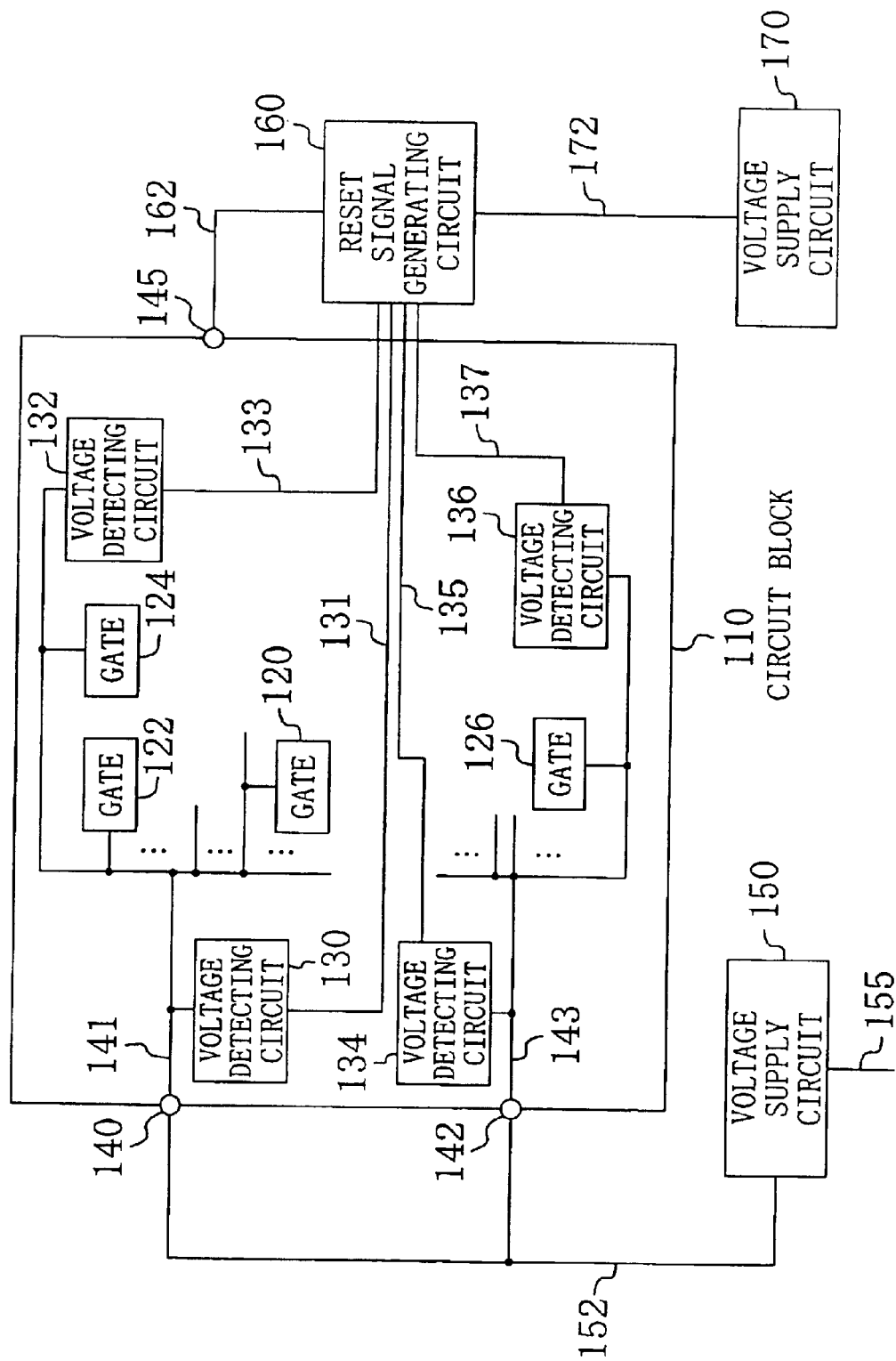
FIG. 1 is a diagram showing an entire configuration of a semiconductor integrated circuit according to a first embodiment of the present invention.
Figure 2:
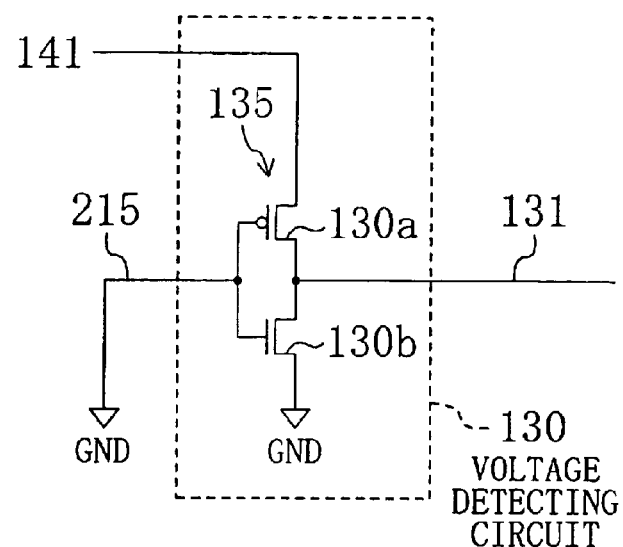
FIG. 2 is a diagram showing an internal configuration of a voltage detecting circuit provided in the semiconductor integrated circuit.

In FIG. 1, reference numeral 110 denotes a circuit block, and reference numeral 150 denotes a first power supply circuit (first power supply means) which supplies power to the circuit block 110 or shuts off the supply. The first power supply circuit 150 receives a power-supply control signal 155 and, when the power-supply control signal 155 is activated, stops the power supply to the circuit block 110, thus reducing power consumption in the circuit block 110.

Reference numeral 160 denotes a reset signal generating circuit (reset signal generating means) which receives voltage detection signals 131, 133, 135 and 137, which are output from the circuit block 110 and will be described later, and supplies a reset signal 162 to the circuit block 110 based on the voltage detection signals. Reference numeral 170 denotes a second power supply circuit (second power supply means) which supplies power to the reset signal generating circuit 160 or shuts off the supply.

The circuit block 110 has two power supply terminals 140 and 142 which are connected to a power line 152 connected to the first power supply circuit 150. The power supplied via the power supply terminals 140 and 142 is supplied to a plurality of logic gates (semiconductor devices) 120, 122 and 124 constituted by MOS transistors incorporated into the circuit block 110 via a power line 141 of one electric-supply system, and is also supplied to a similar logic gate (semiconductor device) 126 via a power line 143 of a different electric-supply system from that of the power line 141. The number of logic gates incorporated into the circuit block 110 is four in FIG. 1, but a large number of logic gates are incorporated therein in reality and several thousands to several tens of thousands of logic gates are normally incorporated therein.

In addition, voltage detecting circuits 130, 132, 134 and 136 are arranged near the power supply terminals 140 and 142, i.e., near the starting points of power supply, and behind the logic gates 124 and 126 farthest from the starting points of power supply. The four voltage detecting circuits 130, 132, 134 and 136 in this arrangement are connected to the power lines 141 and 143. In FIG. 1, the two voltage detecting circuits 130 and 132 are connected to the power line 141 whereas the two voltage detecting circuits 134 and 136 are connected to the other power line 143. Each of the voltage detecting circuits 130, 132, 134 and 136 detects the power-supply potential on the power line 141 or 143 at the connection position thereof and, when the detected power-supply potential is at a predetermined value or more, outputs a voltage detection signal 131, 133, 135 or 137 at an H level (a given level). The number of the voltage detecting circuits 130, 132, 134 and 136 incorporated in the circuit block 110 is two for each of the power lines 141 and 143, i.e., is four in total. However, the present invention is not limited to this, and the voltage detecting circuits may be provided in any number as long as the increase of the power-supply potential on the power lines 141 and 143 is detected.

The circuit block 110 further includes a reset terminal 145 to which a reset signal 162 from the reset signal generating circuit 160 is input. Although not shown, when the potential of the input reset signal 162 is at a Low level, the circuit block 110 initializes all the internal states.

Figure 3:
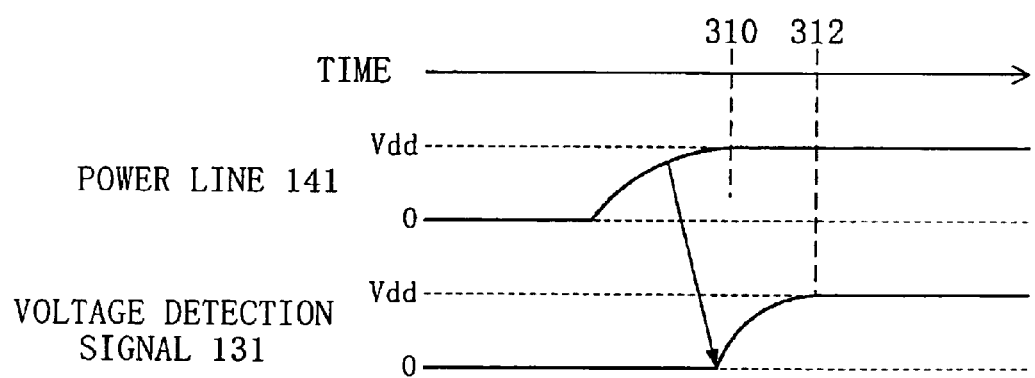
FIG. 3 is a graph showing a relationship between a rising edge of a power supply voltage and a rising edge of a voltage detection signal at turning on power again.

The voltage detecting circuits 130, 132, 134 and 136 have an identical configuration. An internal configuration of the voltage detecting circuit 130 will be described as an example based on FIG. 2. The voltage detecting circuit 130 shown in FIG. 2 includes an inverter 135 in which a p-MOS transistor 130a and an n-MOS transistor 130b are connected to each other. The power line 141 is connected to the drain of the p-MOS transistor 130a. The gate of the p-MOS transistor 130a and the gate and source of the n-transistor 130b are grounded (at a ground level). The source of the p-MOS transistor 130a and the drain of the n-MOS transistor 130b are connected to each other, and the potential at the connection point thereof is output as the voltage detection signal 131. When the potential of power supplied from the power line 141 increases to a value at which the p-MOS transistor 130a starts its operation, the voltage detection signal 131, which is the source potential of the p-MOS transistor 130a, outputs a High level as shown in FIG. 3. In this case, the power-supply potential on the power line 141 reaches a predetermined potential (hereinafter, referred to as Vdd) at time 310 in FIG. 3, and then the voltage detection signal 131 reaches the High level (Vdd level). That is, the power line 141 has already reached the predetermined potential Vdd before the voltage detection signal 131 reaches the High level.

Figure 4:
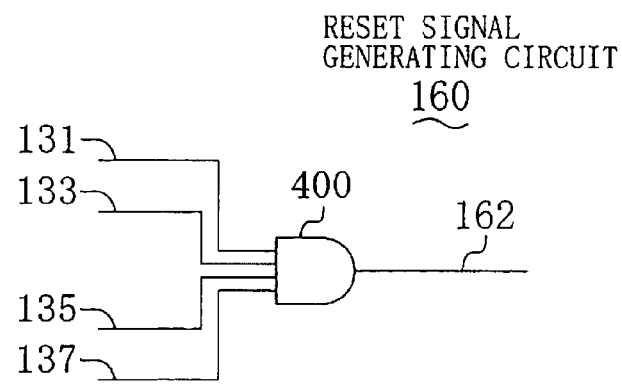
FIG. 4 is a diagram showing an internal configuration of a reset signal generating circuit provided in the semiconductor integrated circuit.

The reset signal generating circuit 160 is configured by a circuit shown in FIG. 4. Specifically, the reset signal generating circuit 160 includes an AND gate 400 to which power is always supplied from a second power supply circuit 170 through a power line 172. The AND gate 400 receives the voltage detection signals 131, 133, 135 and 137 from the four voltage detecting circuits 130, 132, 134 and 136 arranged in the circuit block 110, and detects whether or not all the four voltage detection signals are at the High level, i.e., whether or not all the power-supply potentials at the connection points of the respective voltage detecting circuits 130, 132, 134 and 136 on the power lines 141 and 143 are at the predetermined potential Vdd. If at least one of the voltage detection signals is at a Low level (ground level), the AND gate 400 outputs a reset signal (Low level) 162. On the other hand, if all the four voltage detection signals are at the High level (Vdd level) and the detection result is true, the AND gate 400 stops the output of the reset signal (Low level), while setting its output at the High level (Vdd level).

Now, operation of turning off and then on the power supplied from the power line 152 to the circuit block 110 will be described.

When the power-supply control signal 155 input from outside is active, the first power supply circuit 150 outputs a High level (potential at Vdd) to the power line 152. When operation of the circuit block 110 becomes unnecessary, the power-supply control signal 155 is disabled. In this way, a potential at a Low level (ground level,i.e., 0 V) is output to the power line 152. Since no power is supplied from the power supply terminals 140 and 141 to the circuit block 110, all the operations are stopped. At this time, power consumed in the circuit block 110, i.e., power consumed by the MOS transistors forming the logic gates 120, 122, 124 and 126 incorporated into the circuit block 110, is zero. The voltage detection signals 131, 133, 135 and 137 output from the four voltage detecting circuits 130, 132, 134 and 136 at this time is at the Low level as shown in FIG. 3. Accordingly, the reset signal generating circuit 160 outputs the reset signal 162 at the Low level. The circuit block 110 receives the reset signal 162 from the reset signal generating circuit 160 via the reset terminal 145. Since the potential input to the reset terminal 145 is at the Low level, the inside of the circuit block 110 is in a reset state.

Figure 5:
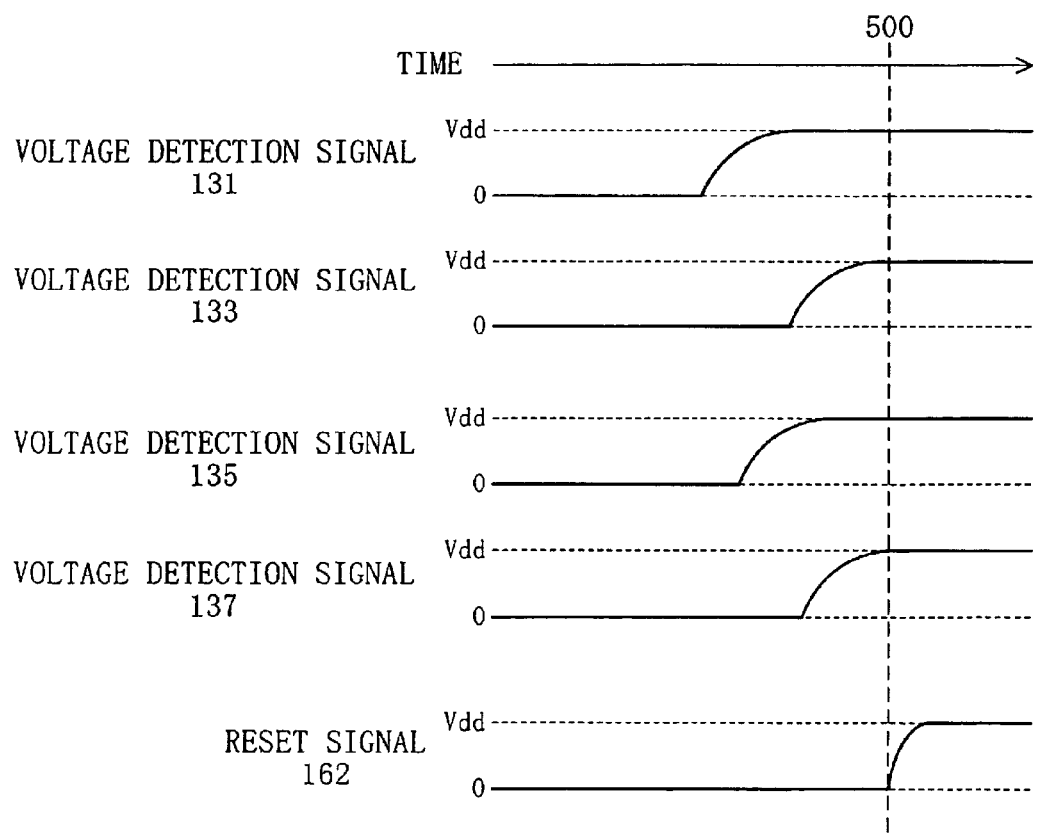
FIG. 5 is a graph showing a relationship between rising edges of a plurality of voltage detection signals and the stopping of a reset signal in the semiconductor integrated circuit.

To resume operation of the circuit block 110 in this state, the voltage control signal 155 is activated first. Then, the first power supply circuit 150 starts outputting a High level (potential at Vdd) to the power line 152, and the circuit block 110 starts power supply from the power supply terminals 140 and 142 to the internal logic gates 120, 122, 124 and 126 through the power lines 141 and 143. At this time, the period required for each of the potentials on the power lines 141 and 143 to rise to the predetermined potential Vdd varies depending on the positions because of the capacitances of the connected logic gates 120, . . . and the wiring capacitances of the power lines 141 and 143 themselves. FIG. 5 shows an example of the state when the change of the voltage detection signal 137 is the latest. In the reset signal generating circuit 160, all the voltage detection signals 131, 133, 135 and 137 are at the High level at time 500 shown in FIG. 5, so that the AND gate 400 produces an output at a High level to start stopping the output of the reset signal 162 at the Low level. At this time, as has been described with reference to FIG. 3, the power lines 141 and 143 in the circuit block 110 have been already at the predetermined potential Vdd at all the positions including the farthest positions from the respective power supply terminals 140 and 142, and all the logic gates 120, 122, 124 and 126 in the circuit block 110 have completed preparations for operation. Thereafter, the stopping of the reset signal (Low level) 162 makes the circuit block 110 stop its reset state, thereby resuming operation.

In this manner, the circuit block 110 stops its reset state after the power-supply potential at every position on the internal power lines 141 and 143 has reached the predetermined potential Vdd, so that the circuit block 110 is always initialized normally and resumes its operation.

EMBODIMENT 2

Now, a semiconductor integrated circuit according to a second embodiment of the present invention will be described with reference to FIGS. 6 and 7. The entire configuration thereof is the same as that shown in FIG. 1, and thus the description thereof will be omitted.

Figure 6:
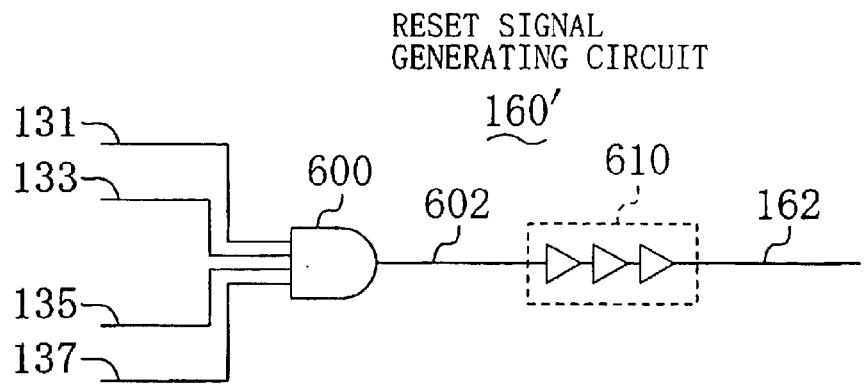
FIG. 6 is a diagram showing an internal configuration of a reset signal generating circuit provided in a semiconductor integrated circuit according to a second embodiment of the present invention.

This embodiment is different from the first embodiment in that the configuration of the reset signal generating circuit 160 shown in FIG. 1 is replaced with a circuit configuration of a reset signal generating circuit 160' shown in FIG. 6. Specifically, in the reset signal generating circuit 160' shown in FIG. 6, an AND gate (logic gate) 600 detects that all the four voltage detection signals 131, 133, 135 and 137 input thereto are at a High level (potential at Vdd), and upon the detection, the AND gate 600 has its output potential transition from a Low level to a High level, thereby stopping the output of a reset signal (Low level) 602. The output signal 602 at the High level is input to a delay unit 610 in which three buffers are cascaded, is delayed by a given time by the delay circuit 610, and then is output to the circuit block 110.

Figure 7:
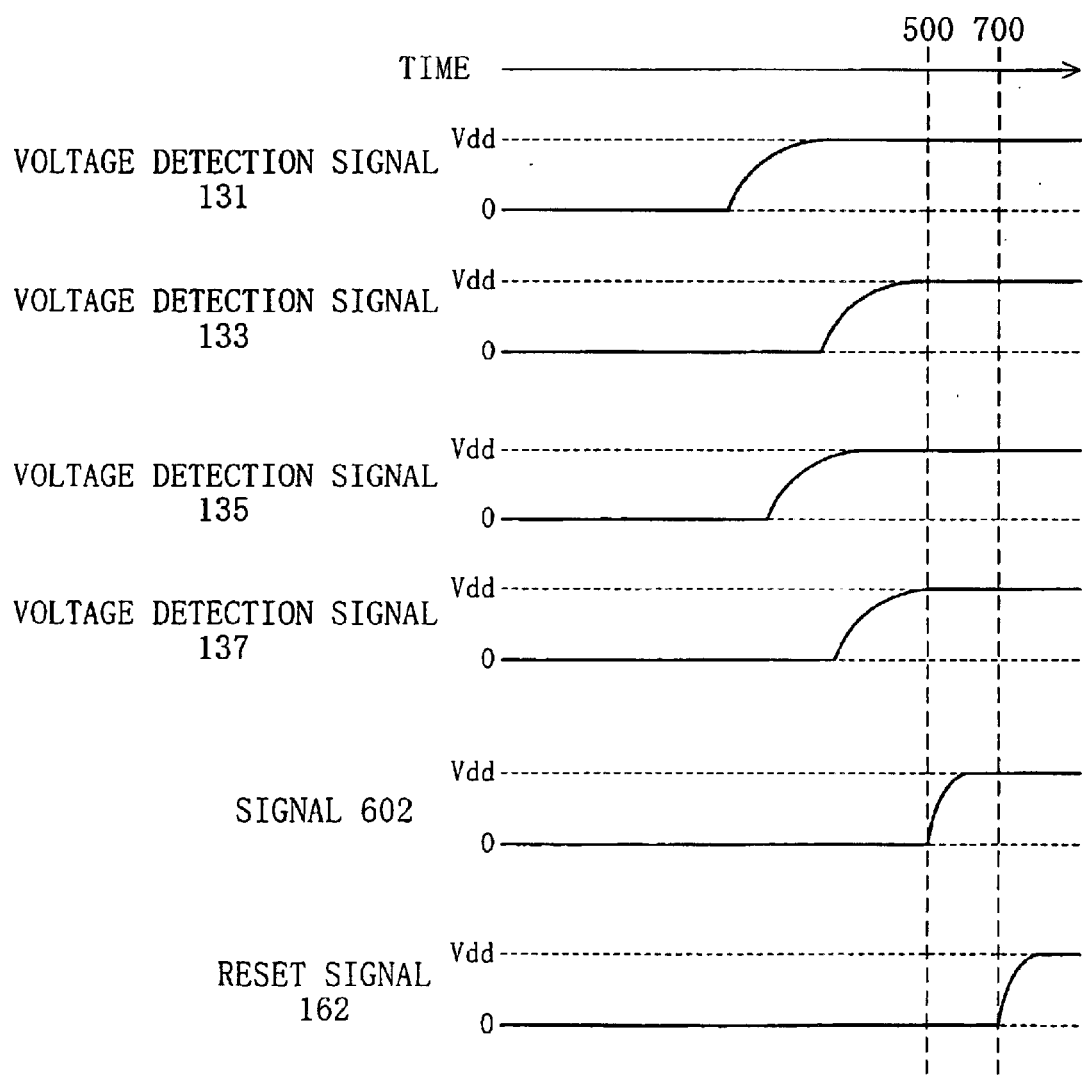
FIG. 7 is a graph showing a relationship between rising edges of a plurality of voltage detection signals and the stopping of a reset signal in the semiconductor integrated circuit.

Accordingly, as is clear from a timing chart shown in FIG. 7, the reset signal (Low level) 162 is stopped (reaches a High level) at a point in time when a delay time produced by the delay circuit 610 has elapsed after time 500 at which the power-supply potential has reached the predetermined potential Vdd at every position on the power lines 141 and 143 in the circuit block 110, i.e., at time 700, thus further ensuring initialization of the circuit block 110, as compared to the first embodiment.

In this embodiment, the delay unit 610 in the reset signal generating circuit 160' is formed by three buffers. Alternatively, any number of buffers may be provided as long as the reset signal is delayed by an appropriate time.

EMBODIMENT 3

Figure 8:
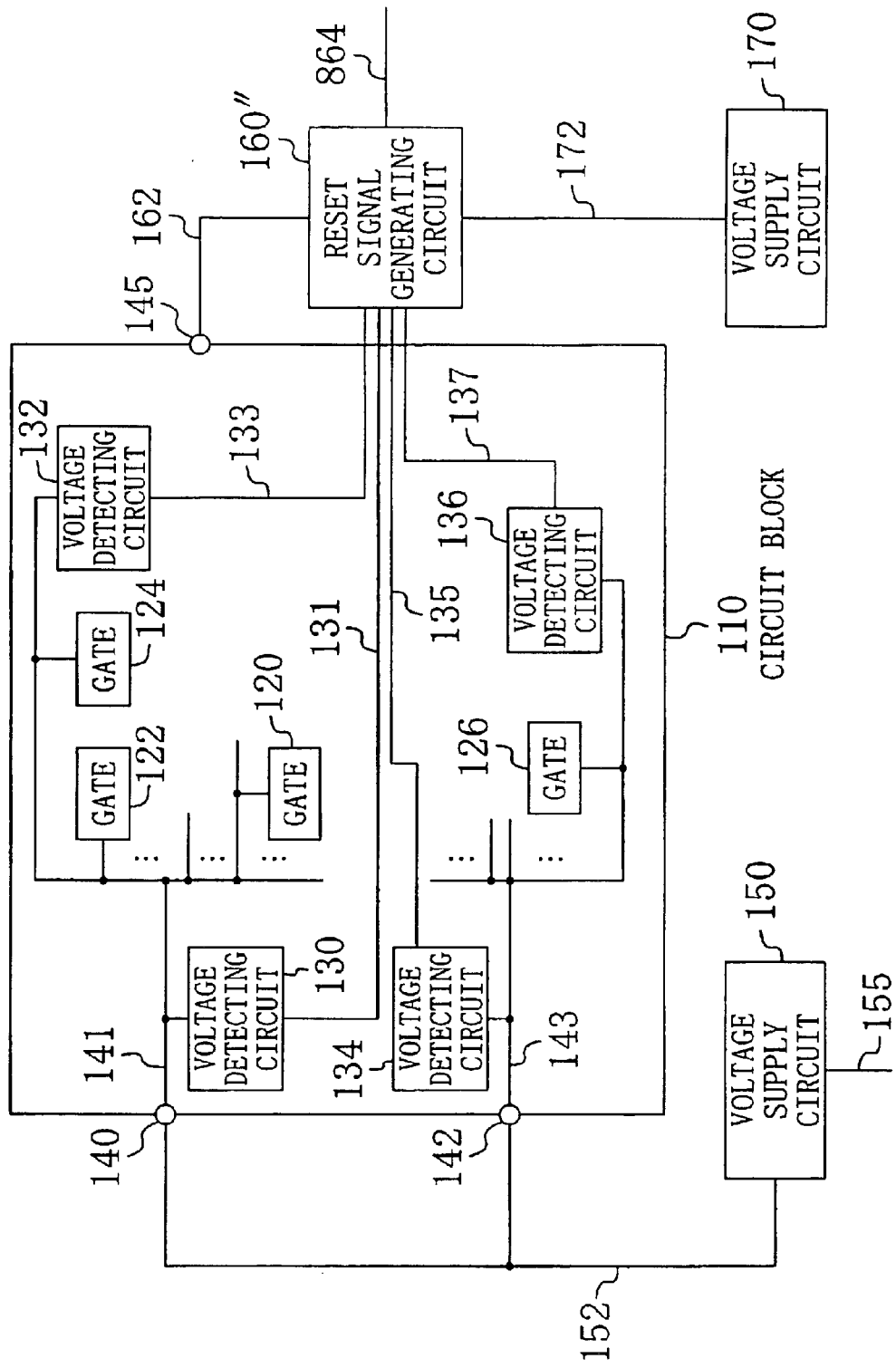
FIG. 8 is a diagram showing an entire configuration of a semiconductor integrated circuit according to a third embodiment of the present invention.

Now, a semiconductor integrated circuit according to a third embodiment of the present invention will be described with reference to FIGS. 8 through 10.

Figure 9:
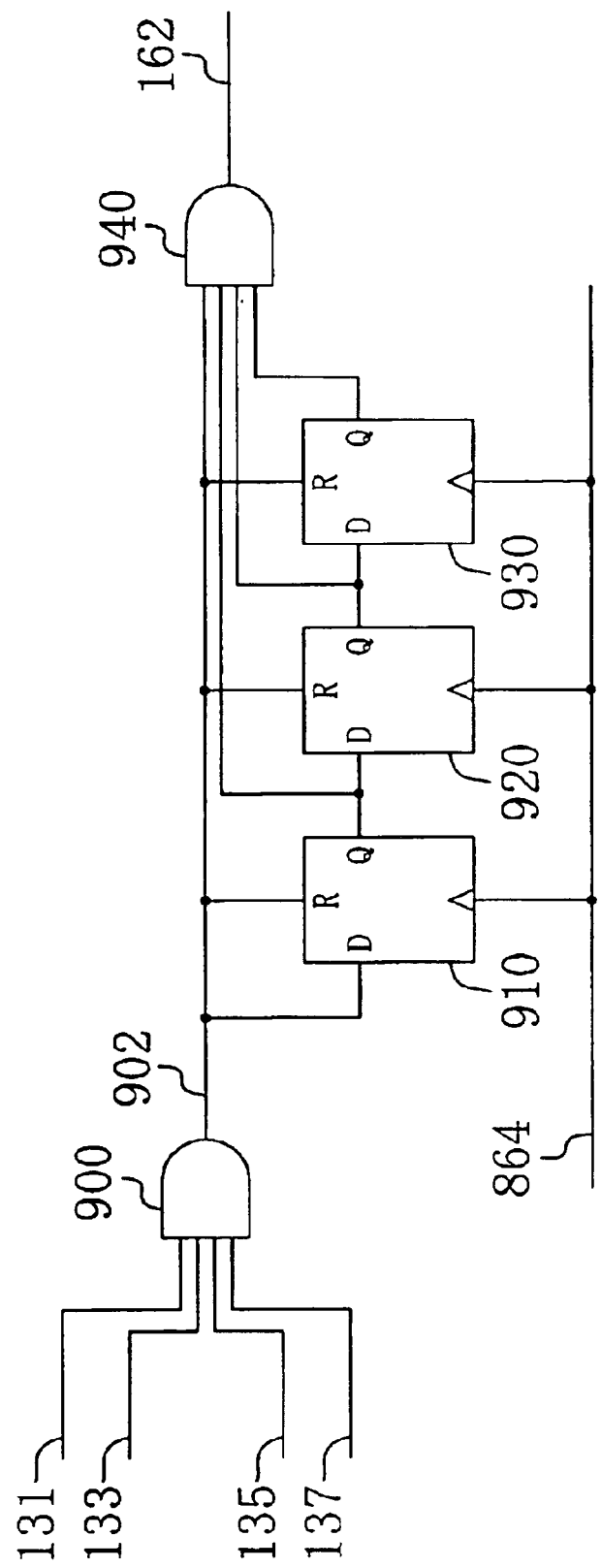
FIG. 9 is a diagram showing an internal configuration of a reset signal generating circuit provided in the semiconductor integrated circuit.

This embodiment is different from the first embodiment in that a clock signal 864 is input to a reset signal generating circuit 160" from outside and that the reset signal generating circuit 160" has an internal configuration shown in FIG. 9.

Specifically, the reset signal generating circuit 160" shown in FIG. 9 includes an AND gate (logic gate) 900, flip-flop circuits 910, 920 and 930 with three stages and another AND gate 940. The AND gate 900 detects that all the four voltage detection signals 131, 133, 135 and 137 input thereto are at a High level (potential at Vdd). Upon this detection, the AND gate 900 outputs a High-level signal 902. The High-level signal 902 stops the reset state of the flip-flop circuits 910, 920 and 930 with three stages. The clock signal 864 is input to each of the flip-flop circuits 910, 920 and 930.

The flip-flop circuit 910 at the first stage holds the High-level signal 902 from the AND gate 900 based on a rising edge of the clock signal 864 and produces an output to the flip-flop circuit 920 at the subsequent stage. The flip-flop circuit 930 at the second stage holds the output of the flip-flop circuit 910 at the first stage based on the rising edge of the next cycle of the clock signal 864 and produces an output to the flip-flop circuit 930 at the third stage. In the same manner, the flip-flop circuit 930 at the third stage (final stage) holds the output of the flip-flop circuit 920 at the second stage based on the next rising edge of the clock signal 864. The other AND gate 940 receives the respective outputs of the flip-flop circuits 910, 920 and 930 with three stages and the High-level signal 902 from the AND gate 900, and performs a logical AND operation, thereby outputting a reset signal 162.

Figure 10:
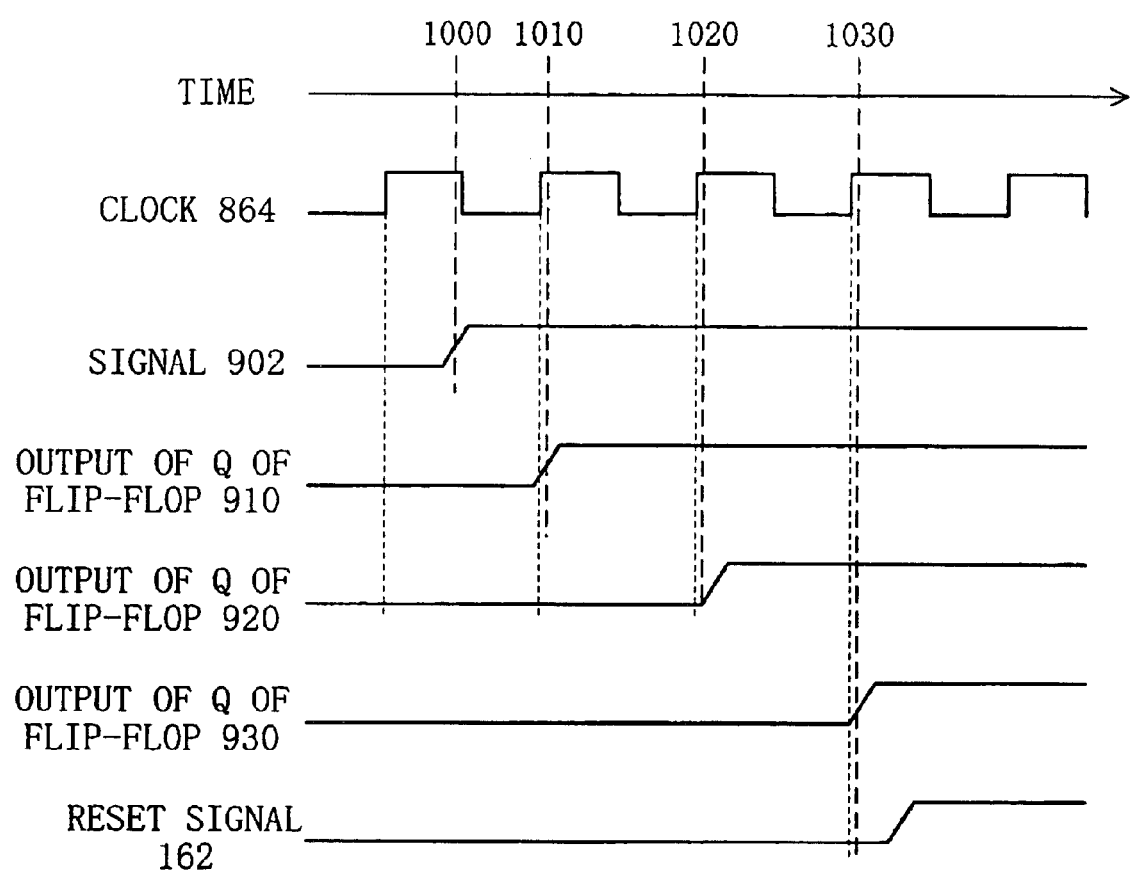
FIG. 10 is a timing chart showing how the reset signal generating circuit operates.

Accordingly, in this embodiment, as shown in FIG. 10, after the signal 902 from the AND gate 900 has reached the High level (i.e., a power line in the circuit block 110 has reached a potential Vdd) at time 1000, this High-level signal 902 is sequentially delayed and held by the flip-flop circuits 910, 920 and 930 based on every cycle of the clock signal 864 at times 1010, 1020 and 1030, respectively. The reset state of the circuit block 110 is not stopped until the three cycles of the clock signal 864 has passed so that the reset signal 162 reaches the High level. Accordingly, an appropriate reset signal is generated even if the reset is stopped after a lapse of a given period of time as a specification of the reset terminal 145 of the circuit block 110.

EMBODIMENT 4

Figure 11:
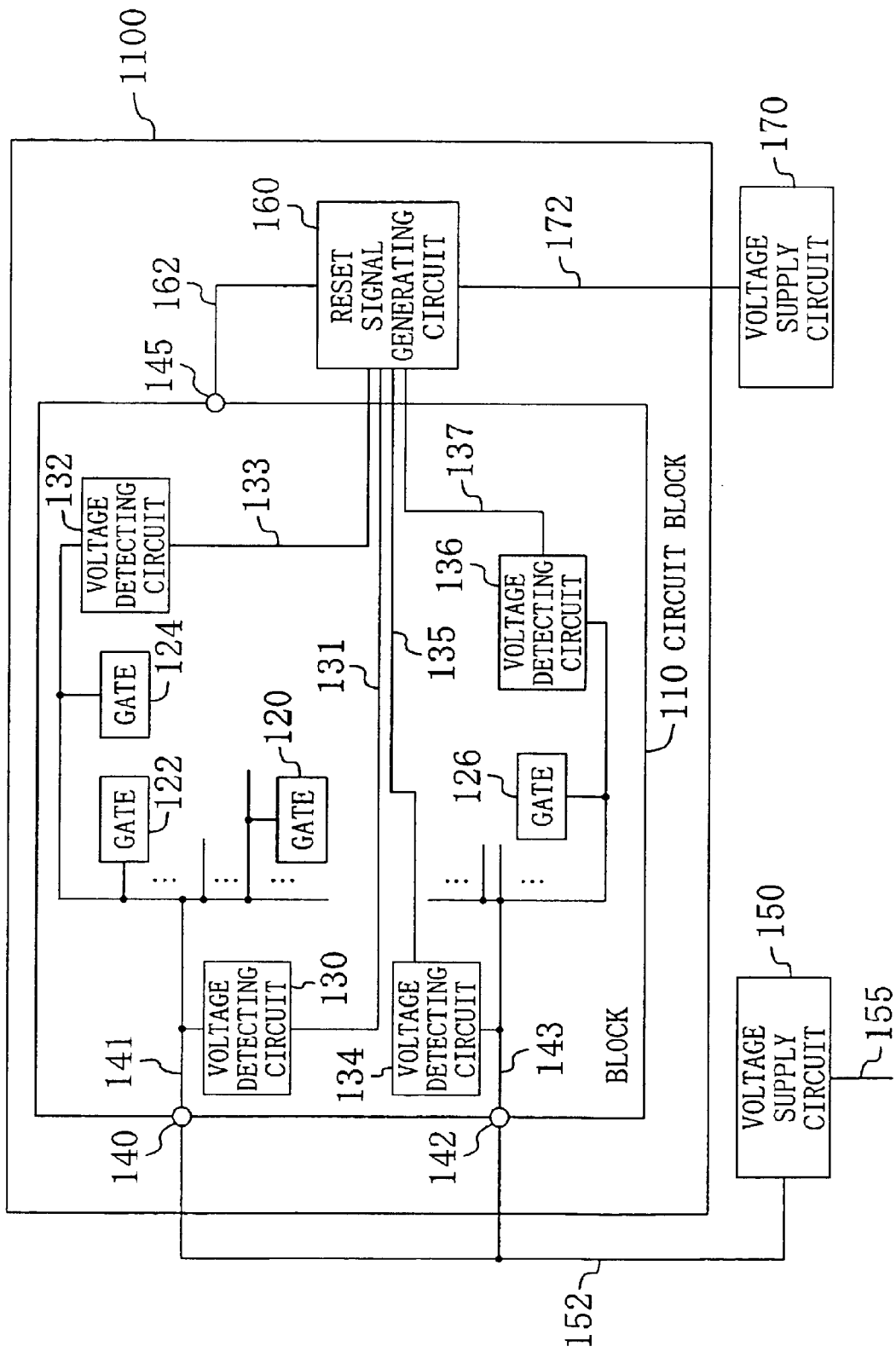
FIG. 11 is a diagram showing an entire configuration of a semiconductor integrated circuit according to a fourth embodiment of the present invention.
Figure 12:
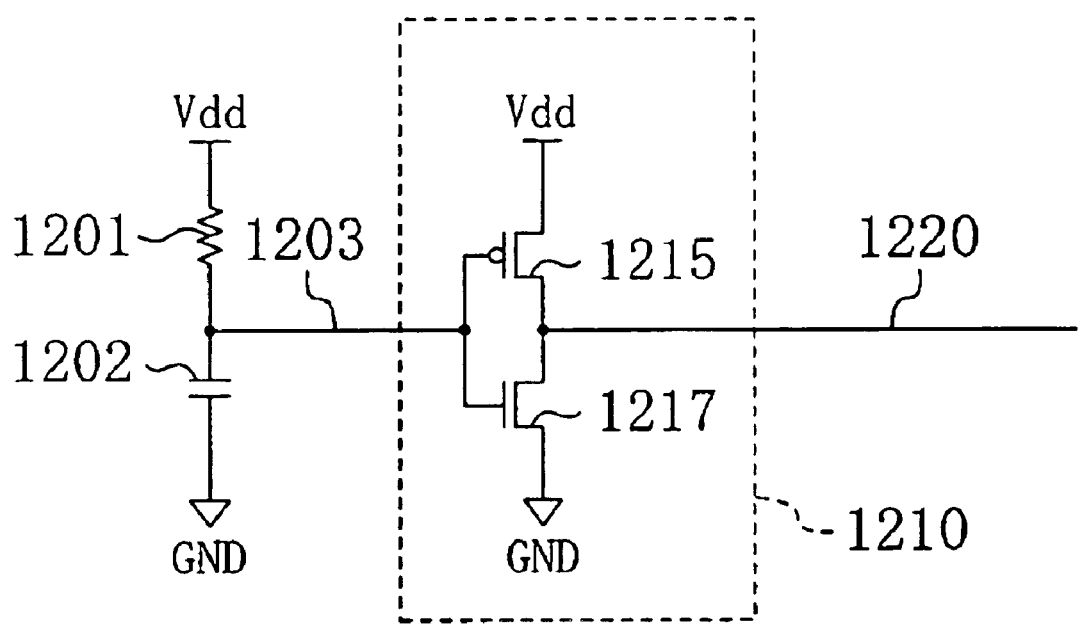
FIG. 12 is a diagram showing a configuration of a conventional circuit for generating a power-on reset signal.

Now, a semiconductor integrated circuit according to a fourth embodiment of the present invention will be described with reference to FIG. 11.

In this embodiment, a circuit block 110 and a reset signal generating circuit 160 are formed and integrated on a single semiconductor substrate, thereby making a single-chip LSI 1100. This eliminates the necessity of controlling the power-on reset to the circuit block 110 from the outside of the LSI 1100. Accordingly, power is always supplied from a second power supply circuit 170 to a power line 172, and it is sufficient that power is supplied from a power line 152 connected to a first power supply circuit 150 only when the circuit block 110 is operated. As a result, a system including the LSI 1100 is easily constructed.

In this embodiment, the circuit block 110 and the reset signal generating circuit 160 are integrated on the single-chip LSI 1100. Alternatively, the first and second power supply circuits 150 and 170 may be incorporated into the single-chip LSI 1100. Then, the number of components constituting the system can be reduced.

In the first through fourth embodiments, the circuit block 110 has the power lines 141 and 143 of two electric-supply systems. Alternatively, the circuit block 110 may, of course, have one electric-supply system or three or more electric-supply systems. The first and second power supply circuits 150 and 170 are configured for specialized use for the circuit block 110 and the reset signal generating circuit 160, respectively. Alternatively, the first and second power supply circuits 150 and 170 may, of course, be a single power supply circuit commonly used for the circuits 110 and 160. In such a case, it is sufficient for the common single power supply circuit to have a configuration capable of controlling power supply to the circuit block 110 via the power line 152 or shut-off of the supply.

What is claimed is:

1. A semiconductor integrated circuit, characterized by comprising:

a circuit block including a power line of at least one electrical system and a plurality of internal semiconductor devices to which power is supplied from the power line;

a plurality of voltage detecting means each connected to the power line at a given position on the power line and each outputting a voltage detection signal at a given potential when the potential at the given position on the power line is a predetermined potentials;

first power supply means for supplying or shutting off power to the circuit block in accordance with a power-supply control signal input from outside;

reset signal generating means for receiving the voltage detection signals from the plurality of voltage detecting means and outputting a reset signal to the circuit block when all the voltage detection signals from the plurality of voltage detecting means are not at the a given potential, while stopping the output of the reset signal to the circuit block after all the voltage detection signals are at the given potential; and second power supply means for supplying power to the reset signal generating means.

2. The semiconductor integrated circuit of claim 1, characterized in that each of the plurality of voltage detecting means includes voltage detecting means connected to the power line at a given position on the power line farthest from a starting point of power supply.

3. The semiconductor integrated circuit of claim 1, characterized in that:
- each of the plurality of voltage detecting means includes a p-MOS transistor and an n-MOS transistor;
- the power line is connected to the drain of the p-MOS transistor;
- the gate of the p-MOS transistor and the source and gate of the n-MOS transistor are grounded; and
- the source of the p-MOS transistor is connected to the drain of the n-MOS transistor at a connection point, and the potential at the connection point is output as the voltage detection signal.

4. The semiconductor integrated circuit of claim 1, characterized in that
- the reset signal generating means includes:
  - a logic gate for receiving the voltage detection signals from the plurality of voltage detecting means and detecting that all the voltage detection signals are at the given potential; and
  - a delay unit for delaying the output of the logic gate by a given time,
  - wherein the output of the delay unit is output to the circuit block as the reset signal.

5. The semiconductor integrated circuit of claim 1, characterized in that
- the reset signal generating means includes:
  - a logic gate for receiving the voltage detection signals from the plurality of voltage detecting means and detecting that all the voltage detection signals are at the given potential; and
  - flip-flop circuits with a plurality of stages for sequentially delaying the output of the logic gate with a clock signal input from outside;
  - the output of the flip-flop circuit at the final stage is output to the circuit block as the reset signal.

6. The semiconductor integrated circuit of claim 1, characterized in that the first power supply means and the second power supply means are integrated on a semiconductor substrate.

7. The semiconductor integrated circuit of claim 1, characterized in that the circuit block and the reset signal generating means are integrated on a semiconductor substrate.

8. The semiconductor integrated circuit of claim 1, characterized in that the circuit block, the reset signal generating means, the first power supply means and the second power supply means are integrated on a semiconductor substrate.

9. A semiconductor-integrated-circuit-resetting method for resetting, to an initial state, a circuit block provided in a semiconductor integrated circuit including: a power line of at least one electrical system; and the circuit block including a plurality of internal semiconductor devices to which power is supplied from the power line, the method being characterized in that:
- power-supply potentials are detected at a plurality of positions on the power line;
- whether or not all the power-supply potentials at the plurality of positions on the power line reach a predetermined potential is detected; and
- a reset signal to be output to the circuit block is stopped when the result of the detection is true.

10. The semiconductor-integrated-circuit-resetting method of claim 9, characterized in that:
- an inverter including a p-MOS transistor and an n-MOS transistor is provided; and
- the potentials on the power line are detected using a potential detecting circuit in which the drain of the p-MOS transistor is connected to the power line.

* * * * *